(12) United States Patent
Kaneko et al.

(10) Patent No.: US 6,885,122 B2
(45) Date of Patent: Apr. 26, 2005

(54) PERMANENT MAGNET MOTOR/ GENERATOR

(75) Inventors: Yutaro Kaneko, Yokohama (JP); Shinichiro Kitada, Tokyo (JP); Toshio Kikuchi, Yoosuka (JP); Takashi Tsuneyoshi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/200,948

(22) Filed: Jul. 24, 2002

(65) Prior Publication Data

US 2003/0025414 A1 Feb. 6, 2003

(30) Foreign Application Priority Data

Jul. 31, 2001 (JP) ........................................ 2001-231400

(51) Int. Cl.[7] .................................................. H02K 1/27
(52) U.S. Cl. ............................ 310/156.38; 310/156.49; 310/156.53; 310/156.55; 310/156.56; 310/156.43
(58) Field of Search ..................... 310/156.53, 156.38, 310/156.45, 156.55–156.6, 156.49–156.5, 156.51, 156.04

(56) References Cited

U.S. PATENT DOCUMENTS

| | | | | |
|---|---|---|---|---|
| 3,840,763 A | * | 10/1974 | Baumann et al. ...... | 310/156.56 |
| 4,327,302 A | * | 4/1982 | Hershberger ........... | 310/156.56 |
| 4,476,408 A | * | 10/1984 | Honsinger ............. | 310/156.84 |
| 5,191,256 A | * | 3/1993 | Reiter et al. ........... | 310/156.49 |
| 5,886,440 A | | 3/1999 | Hasebe et al. | |
| 5,929,547 A | | 7/1999 | Kim | |
| 5,962,944 A | * | 10/1999 | Narita et al. ........... | 310/156.53 |
| 5,990,591 A | * | 11/1999 | Yamaguchi et al. ... | 310/156.53 |
| 6,031,311 A | * | 2/2000 | Lee ........................ | 310/156.57 |
| 6,072,256 A | | 6/2000 | Shon et al. | |
| 6,144,132 A | * | 11/2000 | Nashiki ................. | 310/156.55 |
| 6,239,525 B1 | * | 5/2001 | Matsunobu et al. ... | 310/156.38 |
| 6,340,857 B1 | * | 1/2002 | Nishiyama et al. .... | 310/156.53 |
| 6,441,524 B1 | * | 8/2002 | Kaneko et al. ........ | 310/156.45 |
| 6,445,100 B1 | * | 9/2002 | Tajima et al. .......... | 310/156.57 |
| 6,486,581 B1 | * | 11/2002 | Miyashita et al. ..... | 310/156.53 |

FOREIGN PATENT DOCUMENTS

| | | | | | |
|---|---|---|---|---|---|
| JP | 05176487 A | * | 7/1993 | ............ | H02K/1/27 |
| JP | 7-255138 A | | 10/1995 | | |
| JP | 10-42499 A | | 2/1998 | | |
| JP | 2000-78783 | | 3/2000 | | |
| JP | 2000245085 A | * | 9/2000 | ............ | H02K/1/27 |
| JP | 2000-324736 A | | 11/2000 | | |
| JP | 2000-333391 A | | 11/2000 | | |

* cited by examiner

Primary Examiner—Karl Tamai
Assistant Examiner—Yahveh Comas
(74) Attorney, Agent, or Firm—Foley & Lardner LLP

(57) ABSTRACT

A motor/generator (1) comprises a permanent magnets (3) having a V-shaped surface projecting in the center of a rotor (2). These permanent magnets (3) are disposed so that the V-shaped surface faces the center of the rotor (2). In this way, the permanent magnets (3) are prevented from sliding on the fitting surfaces (21) of the insertion holes (20), and the permanent magnets (3) can be fixed at predetermined positions. Further, magnetic losses caused by the rotor (2) can be reduced, and efficiency of the motor/generator can be improved.

23 Claims, 6 Drawing Sheets

PERMANENT MAGNET MOTOR/GENERATOR

FIELD OF THE INVENTION

This invention relates to the shape of a permanent magnet of a motor/generator.

BACKGROUND OF THE INVENTION

JP2000-78783A published by the Japan patent office in 2000 discloses a motor/generator provided with a rotor comprising a permanent magnet. This permanent magnet has a surface formed as a bulging arc facing the center of the rotor. The area of the permanent magnet in contact with the rotor is made to increase, and local concentration of magnetic flux transmitted to the adjacent permanent magnet is mitigated. Thus, magnetic loss can be reduced and motor efficiency can be improved.

SUMMARY OF THE INVENTION

An insertion hole in which a permanent magnet is inserted is provided in this rotor. This insertion hole is formed slightly larger than the permanent magnet so that it is easy to insert the permanent magnet.

However, due to the shape of this permanent magnet and insertion hole, as the surface of the rotor which fits with the permanent magnet is arc-shaped, the permanent magnet slides along this arc-shaped fitting surface. Consequently, if the permanent magnet is fixed at a position that deviates from the optimum position, the permanent magnet will form a magnetic field that deviates from the optimum position, and the motor torque will decrease.

Also, it is difficult to manufacture the permanent magnet with arc-shaped surface.

It is therefore an object of this invention to suppress local concentration of magnetic flux, and to provide a motor/generator equipped with a permanent magnet formed so that it is attached at the optimal location of the insertion hole of the rotor.

To achieve the above object, a motor/generator comprises a stator that generates magnetic fluxes, a rotor that generates magnetic fluxes reacting with the magnetic fluxes of the stator to rotate, and permanent magnets (3) that are disposed in either the stator or the rotor.

The inner side surface of each of the permanent magnets being on the opposite side of a clearance that the stator and the rotor creates is formed by two or more planes, at least two of the planes forming angles of less than 90 degrees with a center plane, and the center plane passes a rotation axis of the motor/generator and splits each of the permanent magnets into two equal parts.

The details as well as other features and advantages of this invention are set forth in the remainder of the specification and are shown in the accompanying drawings.

DESCRIPTION OF THE PREFERRED EMBODIMENTS

Figure 1:
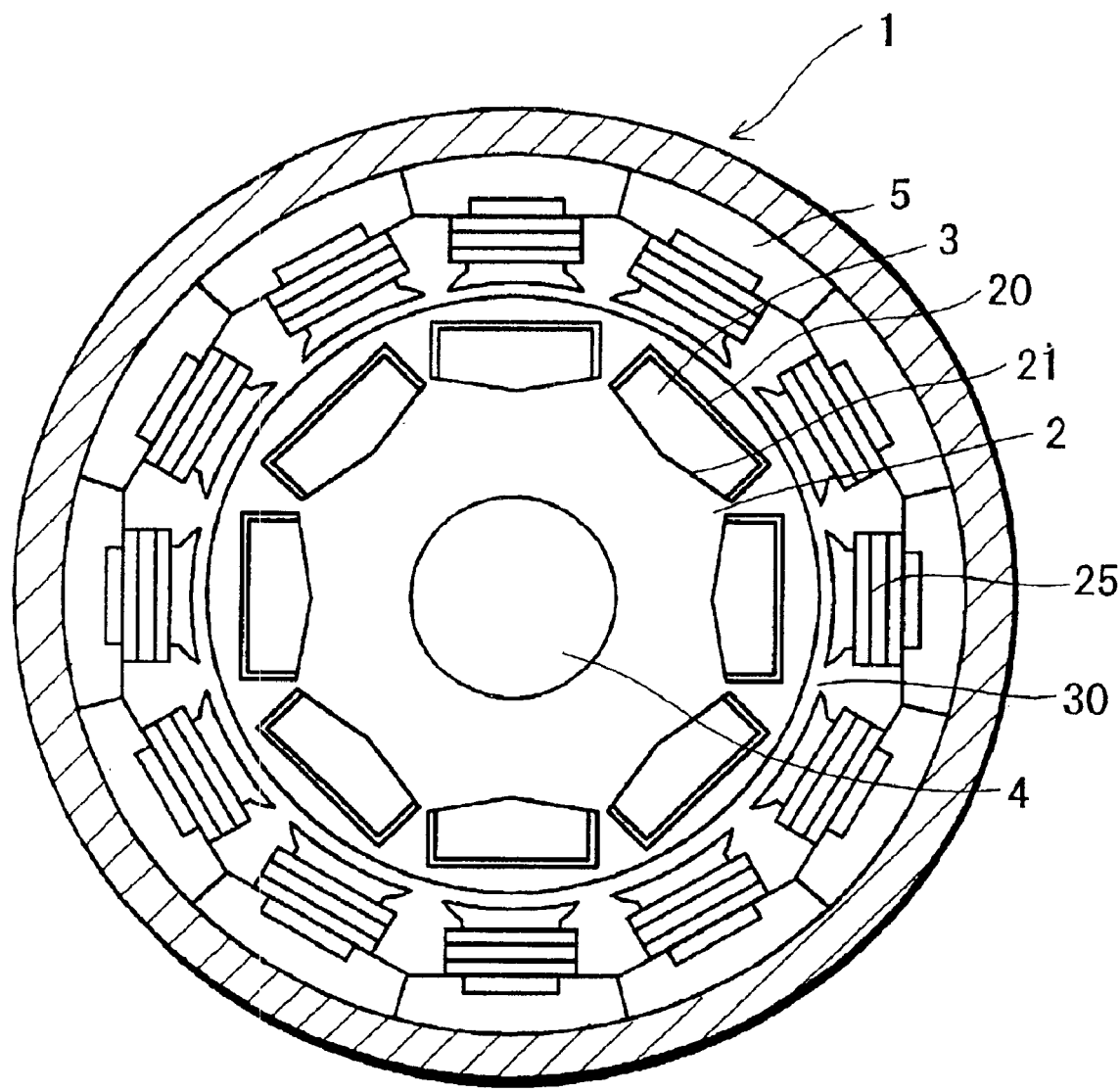
FIG. 1 is a schematic diagram of a motor/generator according to this invention.

Referring to FIG. 1, a motor 1 according to this invention comprises a rotor 2, a stator 5 arranged on the outside of the rotor 2, and plural permanent magnets 3 embedded in the rotor 2.

The stator 5 is provided with an identical number of coils 25 to those of the permanent magnets 3, and the stator 5 generates magnetic fluxes by passing a current in these coils 25.

Plural insertion holes 20 which hold the permanent magnets 3 are formed near the periphery of the rotor 2 housed in the stator 2. The insertion holes 20 are arranged so that there is an equal spacing to the adjacent insertion holes 20. The insertion holes 20 have a similar shape to those of the permanent magnets 3. The insertion holes 20 are formed slightly larger than the size of the permanent magnet 3 so that the magnets 3 can be easily inserted.

Figure 8:
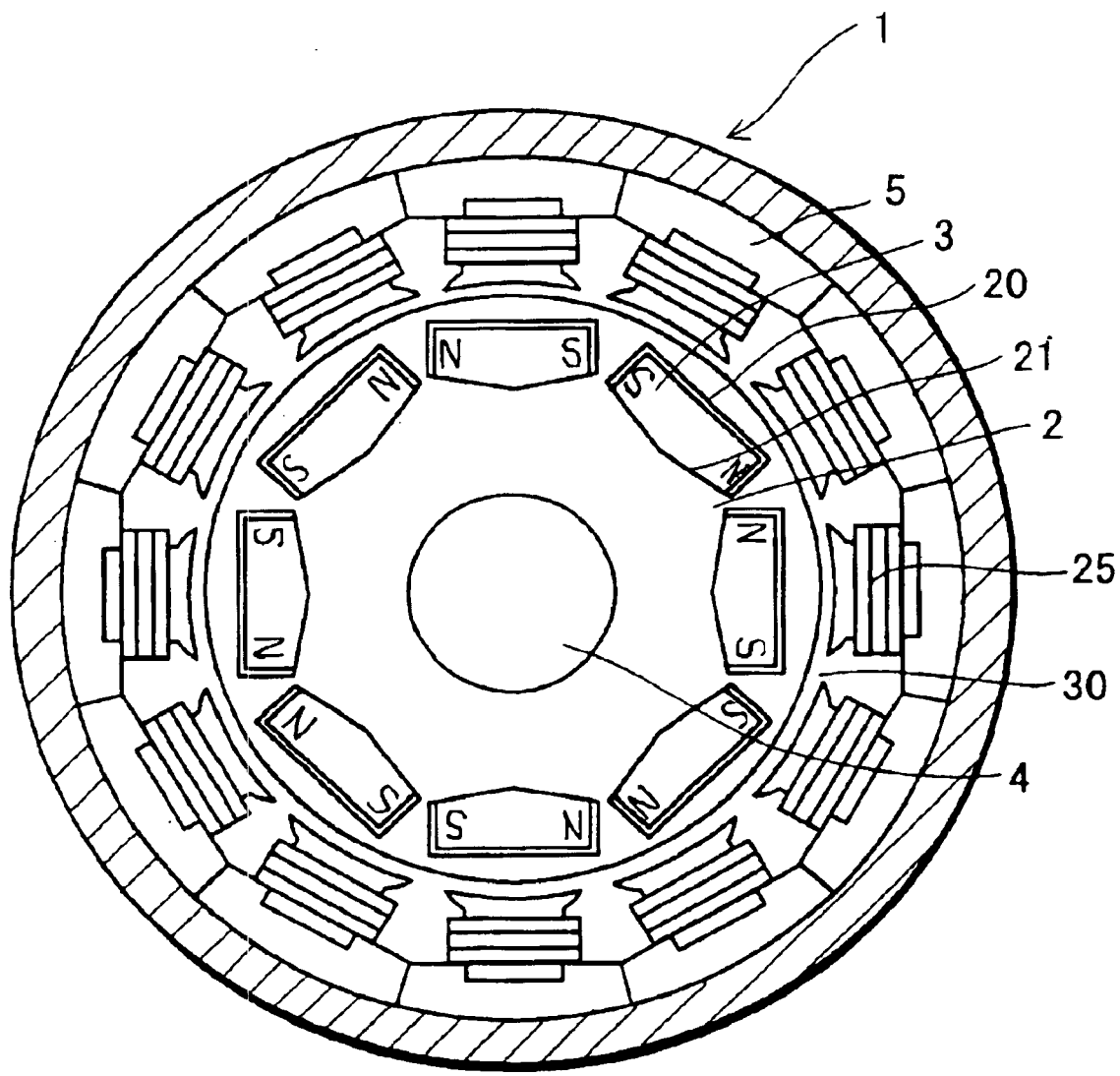
FIG. 8 is a schematic diagram of a motor/generator according to an embodiment of this invention showing permanent magnets disposed alternately so that the magnetization direction and the magnetization direction of the adjacent permanent magnet are opposite each other.

The permanent magnet 3 magnetized by one pole is inserted in the insertion hole 20, and is fixed with an adhesive bond so that it bonds to and fits with the inner side surface 21 of the insertion hole 20 on the side of the rotor core 4. The permanent magnet 3 is fixed so that the centerline of its outer side surface and the radial line of the rotor intersect at right angles. Hence, the permanent magnets 3 generate magnetic fluxes on the periphery and in a direction perpendicular to the outer surface of the rotor 2, interact with the magnetic fluxes generated by the stator 5, and rotate the rotor 2. The permanent magnets 3 are disposed alternately so that the magnetization direction and the magnetization direction of the adjacent permanent magnet 3 are opposite each other, as may be seen by way of example and not by way of limitation in FIG. 8.

A clearance 30 prevents contact between the rotating rotor 2 and the stationary stator 5. The rotor core 4 which supports the rotor 2 so as to maintain the clearance 30 is fixed to the inner surface of the rotor 2.

The rotor 2 shown in FIG. 1 comprises eight of the permanent magnets 3, but the number of the permanent magnets 3 is not limited to eight. The number of permanent magnets 3 can be two or an even number greater than two.

Figure 2:
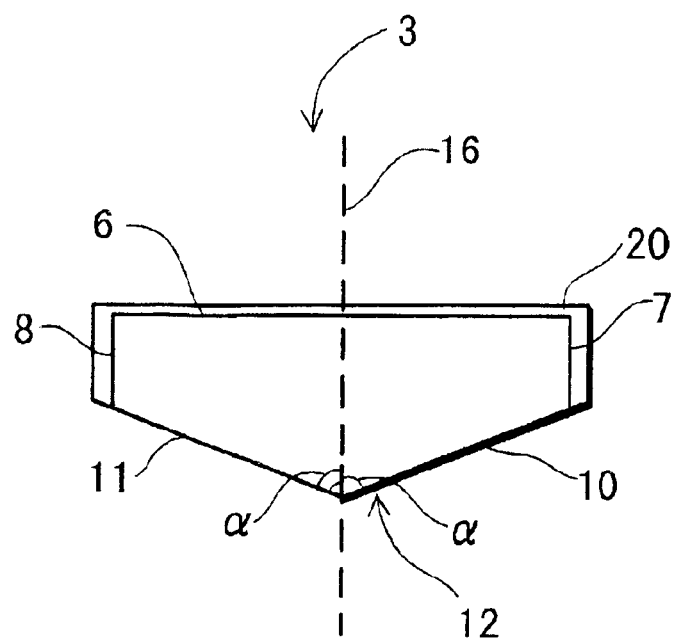
FIG. 2 is a section view of the permanent magnet according to this invention.

Next, the shape of one of the permanent magnets 3 according to this invention will be described referring to FIG. 2. The permanent magnet 3 has an outer side surface 6 of a flat plane facing the outer surface of the rotor 2, a inner side surface 12 of a V-shaped plane facing the inner circumference of the rotor 2, a right-hand side surface 7 of a flat plane which extends toward the inner side surface 12 from the right end of the outer side surface 6 in a perpendicular direction to the outer circumferential surface 6, and a left-hand side surface 8 of a flat plane which extends toward the inner side surface 12 from the left end of the outer side surface 6 in a perpendicular direction to the outer side surface 6.

Here, it is assumed that the surface extending vertically from the centerline of the outer side surface 6 of the permanent magnet 3 toward the inner surface of the rotor 2 is a substantial center plane 16. This substantial center plane 16 is parallel to the direction of the magnetic flux generated by the permanent magnet 3. The inner side surface 12 of the permanent magnet 3 is formed by a right-hand inner side surface 10 and a left-hand inner side surface 11 which are symmetric with respect to the substantial central plane 16. Both the right-hand inner side surface 10 and the left-hand inner side surface 11 form angles α with the substantial center plane 16.

According to this invention, the inner side surface 12 of the permanent magnet 3 is V-shaped surface which projects into the rotor core 4. Therefore, the right-hand inner side surface 10 and left-hand inner side surface 11 respectively form angles α less than 90 degrees with the substantial center plane 16. The inner side surface 21 of the insertion hole 20 is formed in a V-shape which is hollowed in the inner circumferential direction of the rotor 2 corresponding to the shape of the permanent magnet 3. Thus, when the permanent magnet 3 is inserted in the insertion hole 20, the inner side surface 12 of the permanent magnet 3 fits closely to the inner side surface 21 of the insertion hole 20.

The advantage of forming a V-shaped inner side surface 12 of the permanent magnet 3 will be described. An inner side surface of the permanent magnet and an outer side surface of an insertion hole of the prior art are formed in an arc shape, so when the permanent magnet is inserted in the insertion hole, the permanent magnet slides in a circumferential direction of the inner side surface of the insertion hole. If the permanent magnet is fixed in the insertion hole in this sliding state, the direction of the magnetic flux generated by the permanent magnet is misaligned from a predetermined direction, so a performance of the motor will fall.

By forming the inner side surface 12 of the permanent magnet 3 in the V-shape, the sliding of the permanent magnet 3 is prevented and the permanent magnet 3 can be fixed on the predetermined position. Also, even if the inner side surface 12 of the permanent magnet 3 is V-shaped, the magnetic loss of the rotor 2 can be reduced, and the performance of the motor/generator 1 can be improved.

Experimental results relating to the torque characteristics generated by the motor 1 according to this invention will now be described referring to FIG. 3.

When the angle α is 90 degrees, the inner side surface 12 of the permanent magnet 3 is flat, and is not V-shaped. The rotor 2 then has magnetic losses.

Figure 3:
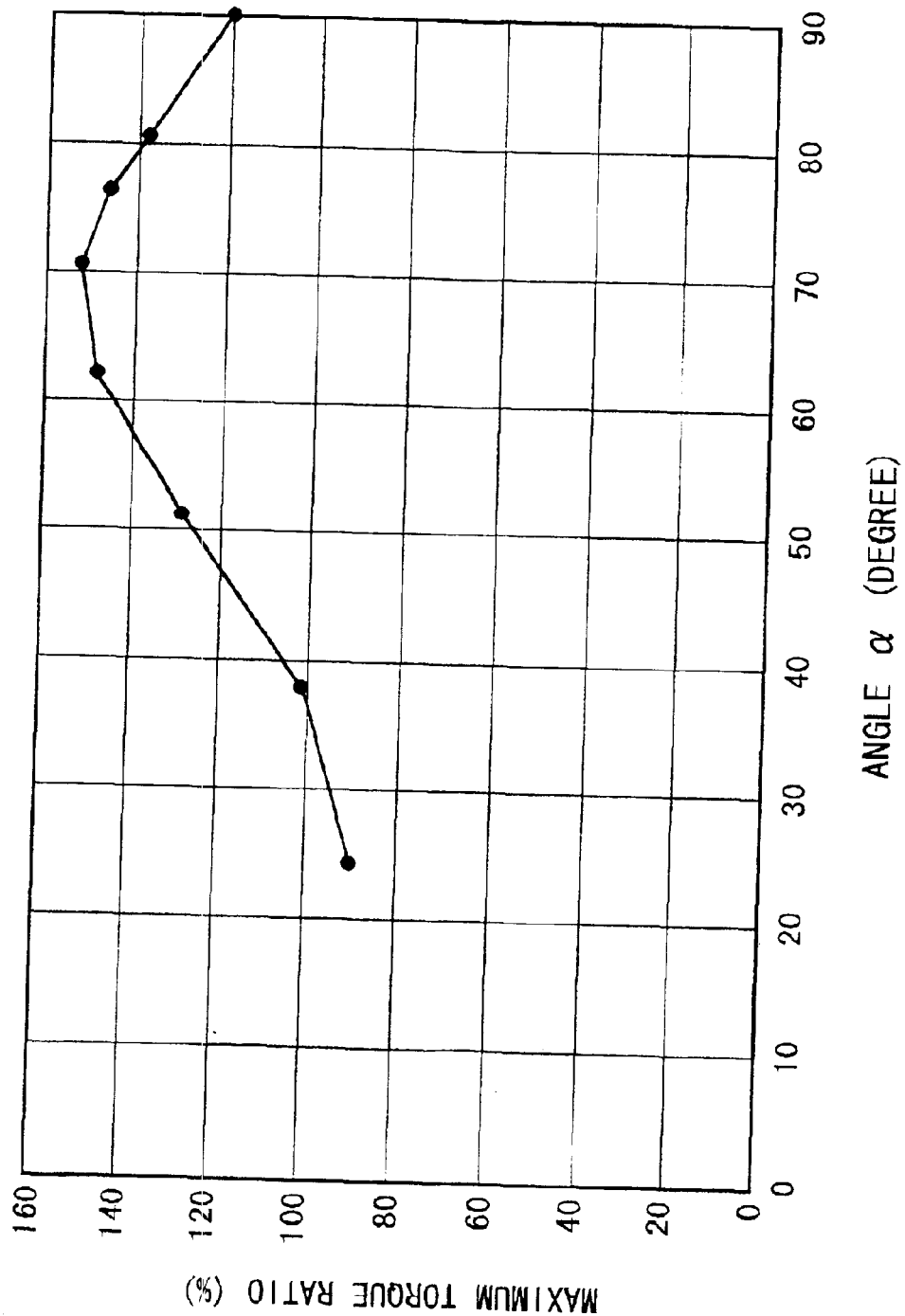
FIG. 3 is a graph describing the characteristic of the motor/generator according to this invention.

As shown in FIG. 3, when the angle α is in a range from 45 degrees to 90 degrees, the magnetic losses of the rotor 2 are reduced, so the maximum torque of the motor 1 increases. In particular, when the angle α is in a range from 55 degrees to 80 degrees, the reduction of magnetic losses is remarkable. If the maximum torque for the angle α of 90 degrees is 120%, the maximum torque in the range of angle α of 55 to 80 degrees increases to 130% or larger.

Another advantage of forming the inner side surface 12 of the permanent magnet 3 in the V-shape is that there is no need to form the inner side surface 12 of the permanent magnet 3 in the arc shape, so manufacture of the permanent magnet 3 becomes easy.

Figure 4:
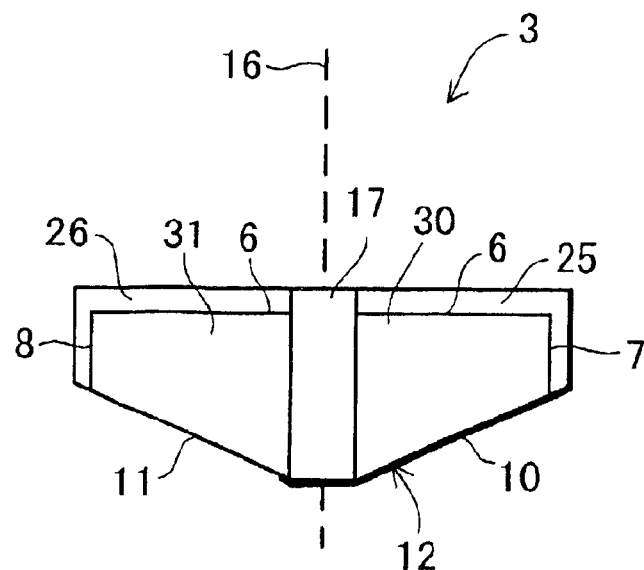
FIG. 4 is a section view of a permanent magnet according to a second embodiment of this invention.

Next, a second embodiment of this invention will be described referring to FIG. 4. Identical components to those of the first embodiment are assigned identical reference numbers.

In this embodiment, the permanent magnet 3 is symmetrically separated into a left side permanent magnet 31 and a right side permanent magnet 30 with respect to the substantial center plane 16. The insertion hole 20 comprises a beam 17 which partitions the housing space into two chambers 25, 26 in the center so as to accommodate these permanent magnets 30, 31. The right-hand chamber 25 of the insertion hole 20 houses the permanent magnet 30 having the right-hand inner side surface 10. The left-hand chamber 26 of the insertion hole 20 houses the permanent magnet 31 having the left-hand inner side surface 11. A set of these permanent magnets 30, 31 functions as the permanent magnet 3 shown in the first embodiment.

Dividing the permanent magnet 3 and interposing the beam 17 in the middle of the insertion hole 20 increase the strength of the rotor 2. Also, the permanent magnets 30, 31 can be manufactured economically with high precision.

Figure 5:
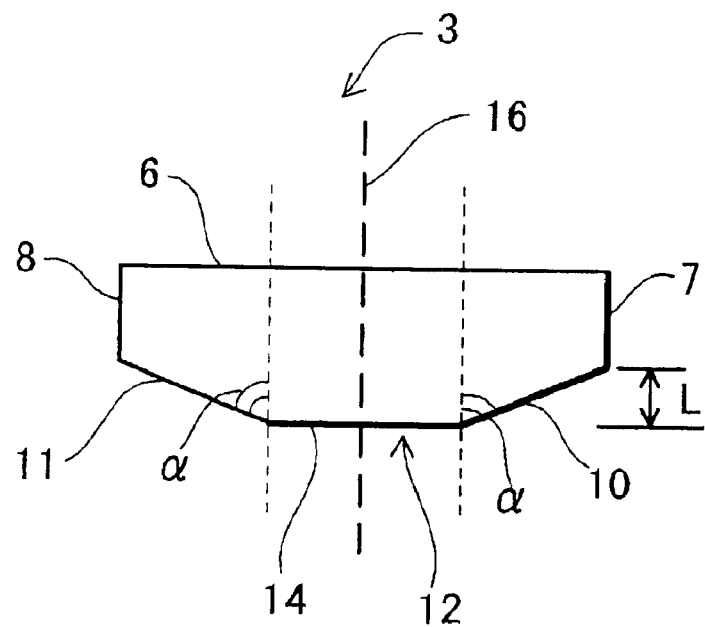
FIG. 5 is a section view of a permanent magnet according to a third embodiment of this invention.

Next, a third embodiment of this invention will be described referring to FIG. 5. Identical components to those of the first embodiment are assigned the same reference numbers.

In this embodiment, the inner side surface 12 of the permanent magnet 3 comprises three planes; the right-hand inner side surface 10, the left-hand inner side surface 11, and a contact plane 14 which connects the substantial center plane 16 side of the right-hand inner side surface 10 and the substantial center plane 16 side of the left-hand inner side surface 11 in parallel with the outer side surface 6. The inner side surface 21 of the insertion hole 20 of the rotor 2 is also formed in the similar shape to the inner side surface 12 of the permanent magnet 3.

Due to this shape, the angle a can be set in the range from 55 degrees to 80 degrees to reduce the magnetic losses without increasing a height L of the inner side surface 12. As a result, this invention can be applied to the motor 1 having a small width between the inner and outer surface of the rotor 2, and an identical effect that of the first embodiment can be obtained.

Figure 6:
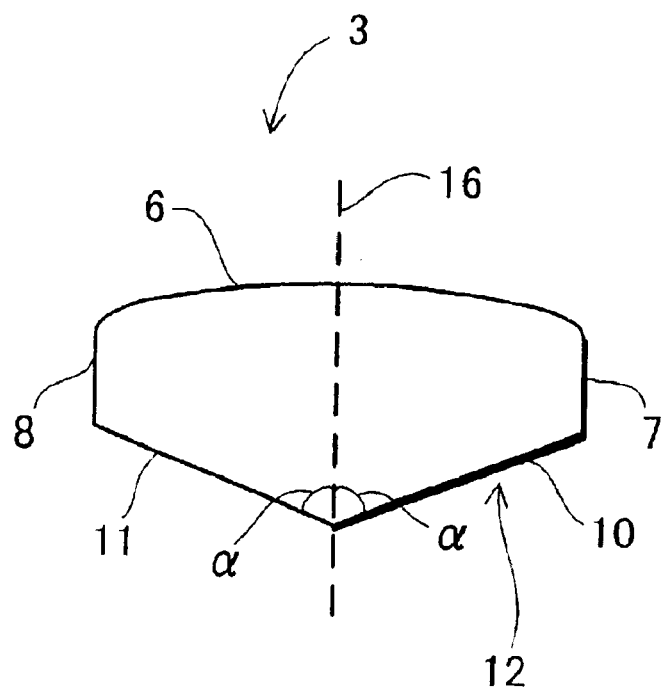
FIG. 6 is a section view of a permanent magnet according to a fourth embodiment of this invention.

Next, a fourth embodiment of this invention will be described referring to FIG. 6. Identical components to those of the first embodiment are assigned identical reference numbers.

In this embodiment, the outer side surface 6 of the permanent magnet 3 is a curved surface parallel to the outer circumference of the rotor 2. Apart from this difference, the remaining parts are identical to those of the first embodiment. Due to this, the magnetic flux generated by the permanent magnet 3 increases.

Figure 7:
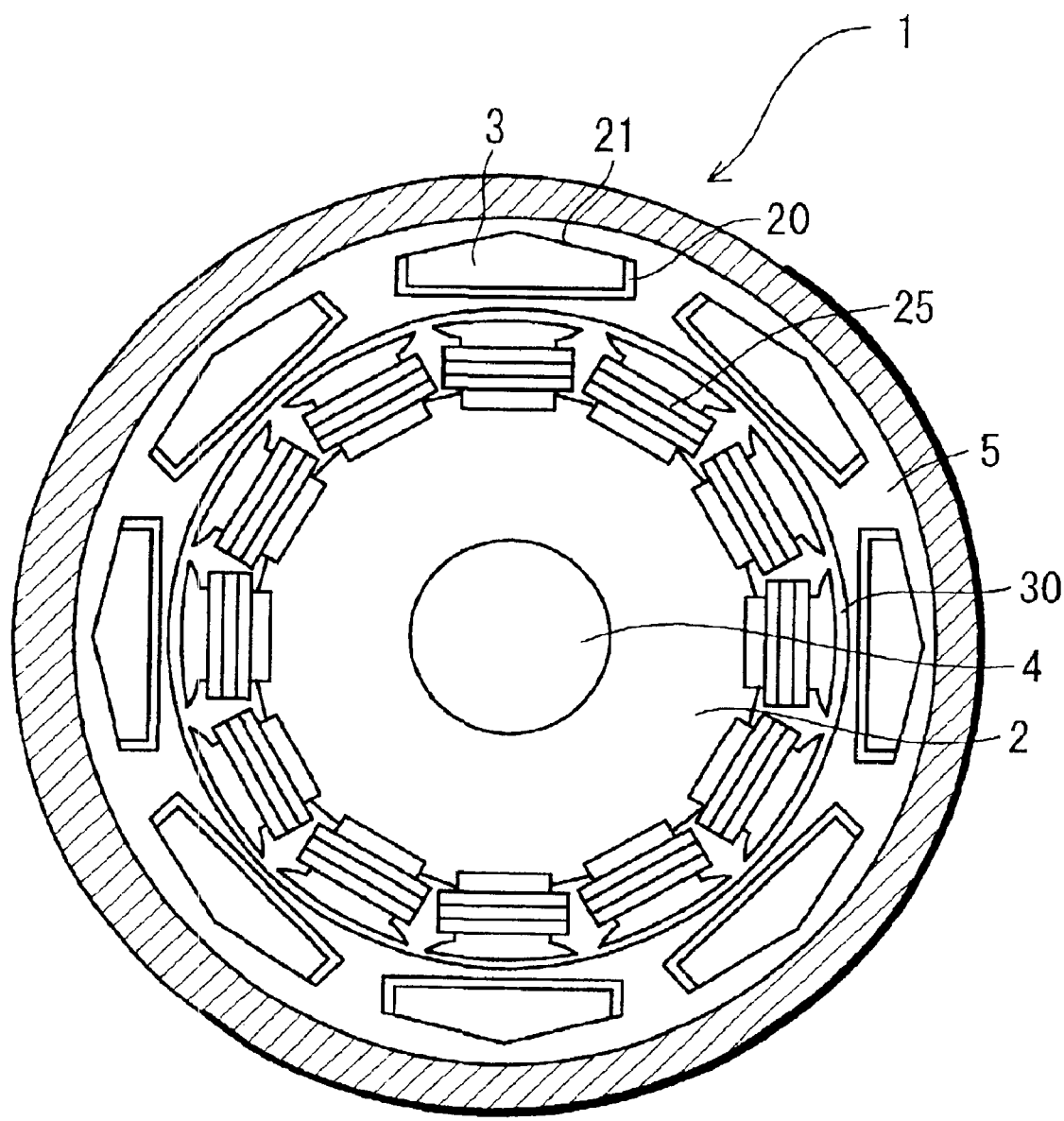
FIG. 7 is a section view of a motor/generator according to a fifth embodiment of this invention.

Next, a fifth embodiment of this invention will be described referring to FIG. 7. Identical components to those of the first embodiment are assigned identical reference numbers.

According to this embodiment, the stator 5 of the motor 1 comprises plural of the permanent magnets 3 of this invention, and the rotor 2 comprises plural of coils 25. The permanent magnets 3 generates a magnetic field toward the coils 25 of the rotor 2, so the permanent magnets 3 are disposed in the stator 5 to have the inner side surfaces 12 face toward the opposite direction of the rotor 2.

Thus, misalignments due to sliding of the permanent magnets 3 can be prevented, and magnetic losses can be reduced.

This invention may be applied not only to a motor, but also to a generator.

The entire contents of Japanese Patent Application P2001-231400 (filed on Jul. 31, 2001) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A motor/generator comprising:
    a stator that generates magnetic fluxes;
    a rotor that generates magnetic fluxes reacting with the magnetic fluxes of the stator to rotate; and
    a plurality of permanent magnets that are disposed in either the stator or the rotor,
    wherein the permanent magnets are placed around either an inner side of the stator or an outer side of the rotor, with alternating right direction of magnetic flux and an opposite direction of magnetic flux,
    wherein a pole of each permanent magnet comprises a plane facing a clearance formed by the stator and the rotor and perpendicularly intersecting with a center plane, and an opponent surface, wherein
    the center plane passes a rotation axis of the motor/generator and splits each permanent magnet into two equal parts, the opponent surface being formed by two or more planes, at least two of the planes forming angles of less than 90 degrees, as measured on the side of the clearance, with the center plane, and each having a size bigger than a half of the plane facing the clearance formed by the stator and the rotor, and
    wherein a direction of the magnetic flux generated by the permanent magnets is parallel to the center plane.

2. The motor/generator as defined in claim 1, wherein the angle is more than 45 degrees and less than 90 degrees.

3. The motor/generator as defined in claim 2, wherein the angle is more than 55 degrees and less than 80 degrees.

4. The motor/generator as defined in claim 1, the motor/generator comprising a beam in a housing space for each of the permanent magnets, wherein the beam partitions each of the permanent magnets into more than two parts.

5. The motor/generator as defined in claim 1, wherein the permanent magnets are disposed in the rotor.

6. The motor/generator as defined in claim 5, wherein the inner side surface of each of the permanent magnets has a plane that is orthogonal to a radius of the rotor.

7. A motor/generator comprising:
    a stator that generates magnetic fluxes;
    a rotor that generates magnetic fluxes reacting with the magnetic fluxes of the stator to rotate; and
    permanent magnets that are disposed in either the stator or the rotor,
    wherein an inner side surface of each of the permanent magnets located on the opposite side of a clearance that the stator and the rotor creates is formed by two or more planes, at least two of the planes forming angles of less than 90 degrees, as measured on the side of the clearance, with a center plane, wherein
    the center plane passes a rotation axis of the motor/generator and splits each of the permanent magnets into two equal parts,
    wherein a direction of the magnetic flux generated by the permanent magnets is parallel to the center plane,
    wherein the permanent magnets are disposed in the rotor,
    wherein the outer side surface of each of the permanent magnets being on the side of the clearance has a curved plane in parallel with an outer surface of the rotor, and wherein
    each of the at least two planes forming angles of less than 90 degrees, as measured on the side of the clearance, with a center plane, have a surface area about equal to or greater than that of a half of the curved plane in parallel with an outer surface of the rotor.

8. The motor/generator of claim 1, further comprising housings for a plurality of the permanent magnets, the housings having side walls adjacent to the magnets, at least two of the side walls of the housing being formed by two or more planes, at least two of the planes of the housings forming angles of less than 90 degrees, as measured on the side of the clearance, with the center plane.

9. The motor/generator of claim 8, wherein the two or more planes of the housing forming angles of less than 90 degrees form angles substantially the same as the angle formed by the two or more planes of the magnets.

10. The motor/generator of claim 9, wherein a cross section through the housing taken normal to the axis of rotation of the rotor is substantially of the same shape as a cross section through the permanent magnet located in the housing, the cross section through the permanent magnet being on the same plane as the cross section through the housing.

11. The motor/generator of claim 10, wherein a gap is located between the permanent magnet and the housing on the side of the clearance that the stator and the rotor create.

12. The motor/generator of claim 10, wherein a gap is located between the permanent magnet and the housing on the left and right sides, as determined by the center plane, of the permanent magnets.

13. The motor/generator of claim 11, wherein a gap is located between the permanent magnet and the housing on the left and right sides, as determined by the center plane, of the permanent magnets.

14. A motor/generator comprising:
    a stator that generates magnetic fluxes;
    a rotor that generates magnetic fluxes reacting with the magnetic fluxes of the stator to rotate; and
    permanent magnets that are disposed in either the stator or the rotor,
    wherein an inner side surface of each of the permanent magnets located on the opposite side of a clearance that the stator and the rotor creates is formed by two or more planes, at least two of the planes forming angles of less than 90 degrees, as measured on the side of the clearance, with a center plane, wherein
    the center plane passes a rotation axis of the motor/generator and splits each of the permanent magnets into two equal parts, and
    wherein a direction of the magnetic flux generated by the permanent magnets is parallel to the center plane,
    wherein the permanent magnets are curved on the side of the clearance that the stator and the rotor create, the curvature and the position of the magnet being such that a substantial portion of the curvature of the magnet is concentric with the general curvature of the rotor, and wherein
    each of the at least two planes forming angles of less than 90 degrees, as measured on the side of the clearance, with a center plane, have a surface area about equal to or greater than that of a half of the surface formed by the curve on the side of the clearance that the stator and the rotor create.

15. A method of making a motor/generator according to claim 1, comprising selecting permanent magnets with the at least two planes forming an angle that results in substantially minimum magnetic losses of the rotor during operation of the motor/generator.

16. A method of making a motor/generator according to claim 1, comprising selecting permanent magnets with angles that results in the torque of the motor/generator being substantially maximized during operation of the motor/generator.

17. A method of making a motor/generator according to claim 1, comprising forming a plurality of housings for a plurality of the permanent magnets in at least one of the rotor and stator, wherein the at least two planes are adapted to substantially prevent sliding of the permanent magnets while in the housings.

18. The motor/generator according to claim 1, wherein the at least two planes of the permanent magnets are adapted to substantially prevent sliding of the permanent magnets.

19. A method of making a motor/generator according to claim 1, comprising selecting permanent magnets with angles that are adapted to substantially prevent sliding of the permanent magnets.

20. The motor/generator of claim 1, wherein the opponent surface consists of two planes.

21. The motor/generator of claim 1, wherein the opponent surface consists of:
   three planes, wherein one of the planes is parallel to the plane facing the clearance.

22. The motor/generator of claim 1, wherein the opponent surface comprises two planes.

23. The motor/generator of claim 1, wherein the opponent surface comprises:
   three planes, wherein one of the planes is parallel to the plane facing the clearance.

* * * * *